Nov. 24, 1964  W. J. WHITFIELD  3,158,457
ULTRA-CLEAN ROOM
Filed May 14, 1962  7 Sheets-Sheet 1

INVENTOR.
Willis J. Whitfield
BY
Attorney

Nov. 24, 1964  W. J. WHITFIELD  3,158,457
ULTRA-CLEAN ROOM
Filed May 14, 1962  7 Sheets-Sheet 2

INVENTOR.
Willis J. Whitfield
BY

Attorney

Nov. 24, 1964  W. J. WHITFIELD  3,158,457
ULTRA-CLEAN ROOM

Filed May 14, 1962  7 Sheets-Sheet 3

INVENTOR.
Willis J. Whitfield
BY

Attorney

Nov. 24, 1964

W. J. WHITFIELD 3,158,457

ULTRA-CLEAN ROOM

Filed May 14, 1962

INVENTOR.
Willis J. Whitfield
BY

Attorney

Nov. 24, 1964    W. J. WHITFIELD    3,158,457
ULTRA-CLEAN ROOM

Filed May 14, 1962    7 Sheets-Sheet 6

INVENTOR.
Willis J. Whitfield
BY
Attorney

United States Patent Office 3,158,457
Patented Nov. 24, 1964

3,158,457
ULTRA-CLEAN ROOM
Willis J. Whitfield, Albuquerque, N. Mex., assignor, by mesne assignments, to the United States of America as represented by the United States Atomic Energy Commission
Filed May 14, 1962, Ser. No. 194,740
9 Claims. (Cl. 55—472)

The present invention relates generally to dust-free enclosures and more particularly to enclosures having confined air continuously circulated and cleaned so as to provide substantially contamination-free working environments within the enclosures.

There has for some time been a problem of cleanliness in working environments such as in hospital operating rooms and in industrial work areas where complex and miniaturized components are assembled. For example, in industry some intricate and delicate mechanisms in use today require such extremely rigid specifications that contamination by dust particles and the like may render the mechanisms incapable of performing their intended functions. Normally these highly complex and miniaturized components are assembled in enclosed clean rooms or under air-hoods where the air is filtered to provide a supposedly "clean" working environment. However, the heretofore known clean rooms and air-hoods suffer several shortcomings which prevent the attainment of optimum working conditions. Such shortcomings include expensive and time consuming operations as, for example, the necessity of providing special clothing to make the workers as dust-free as possible prior to their entering the rooms and the need for constantly cleaning the rooms by vacuuming or the like to remove the accumulated dust from the floors and other working areas. Also with the conventional clean rooms so much time and effort is required to reach "low" levels of dust contamination after the air filtering system is put into operation that most of them are never shut down and must be kept operating full time in attempting to stay clean. Perhaps the greatest shortcoming of conventional clean rooms and air-hoods is their inability to sufficiently cleanse the air so as to provide substantially contamination-free assembly of the complex components. In the most efficient clean rooms heretofore known to industry the air within the rooms after being "cleansed" still contains over one-million dust particles, one-third of a micron or larger, per cubic foot of air. (A micron is equal to 40-millionths of an inch.) The air-hoods, which are somewhat more efficient than and are normally contained in the conventional clean rooms, "clean" the air to where about 100,000 dust particles, one-third of a micron or larger, per cubic foot of air remain.

The ultra-clean room of the present invention obviates or substantially minimizes the above problems by providing a clean room in which the air is continuously circulated and highly filtered so as to create an environment within the working area or working volume of a clean room that is about 1000 times cleaner than that possible in the previously known clean rooms and about 100 times cleaner than that obtainable in an air-hood within a conventional clean room. The ultra-clean room of the present invention operates by circulating a large amount of air (about 10 changes of air per minute) through the room in such a manner that the incoming air performs a "sweeping" function over the working areas. Thus, due to the unique design and operation of the present device, special clothing is not necessary nor is it necessary to continually operate the air circulating system or vacuum the room since the clean room "cleans" itself almost immediately after the air circulating system is turned on.

An object of the present invention is to provide a new and improved ultra-clean room capable of providing working environments substantially cleaner than heretofore known.

Another object of the present invention is to provide an air circulating system for the clean room that is capable of circulating an unprecedented volume of ultra-clean air through the working area in the clean room.

A further object of the present invention is to provide an improved clean room in which the circulating air continuously "sweeps" the work area to remove dust contamination.

A still further object of the present invention is to provide a portable clean room capable of being moved as a unit or dismantled, moved in parts and reassembled.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
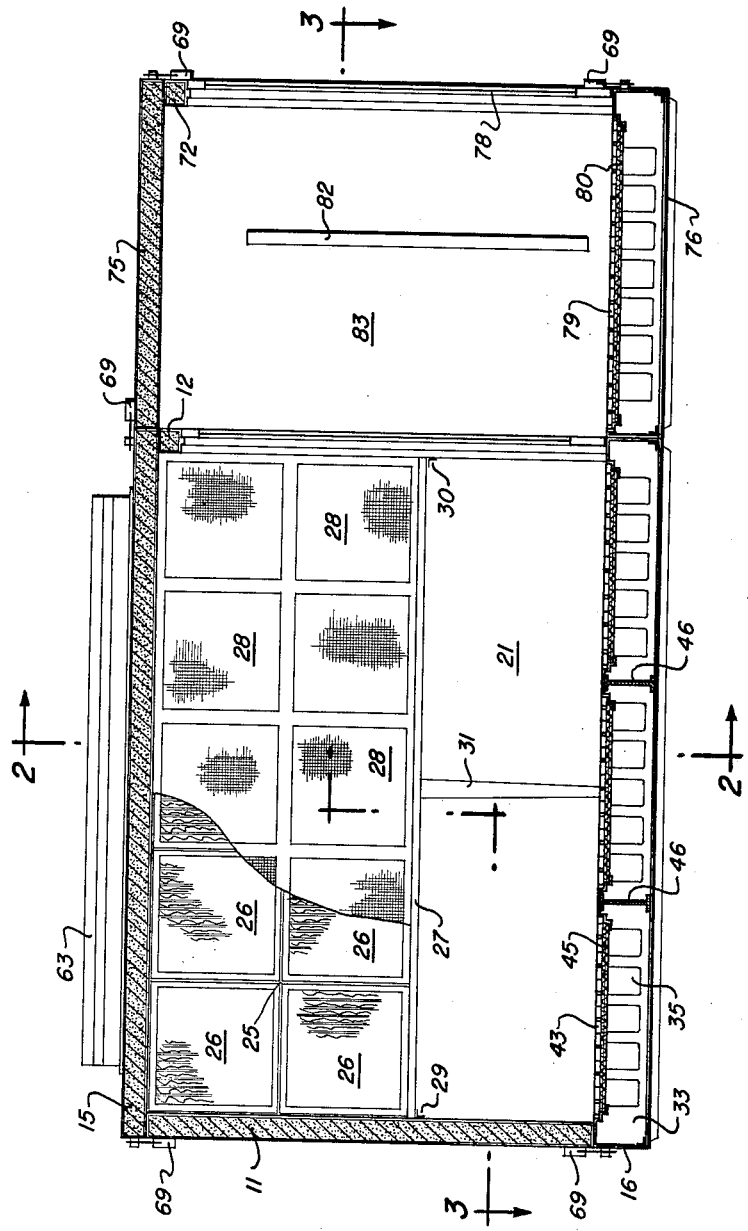
FIG. 1 is a longitudinal vertical sectional view showing one embodiment of the present invention with an air-shower or air-lock attached thereto.
Figure 2:
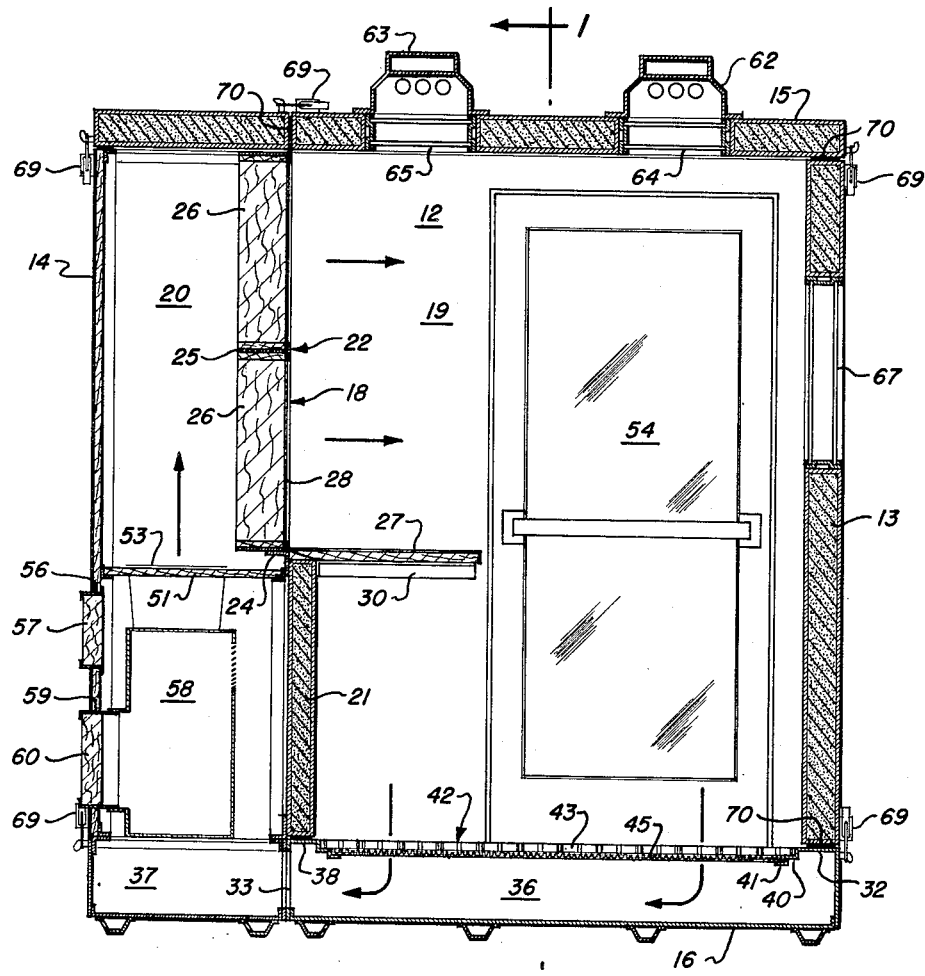
FIG. 2 is an elevational section view taken along line 2—2 of FIG. 1.
Figure 3:
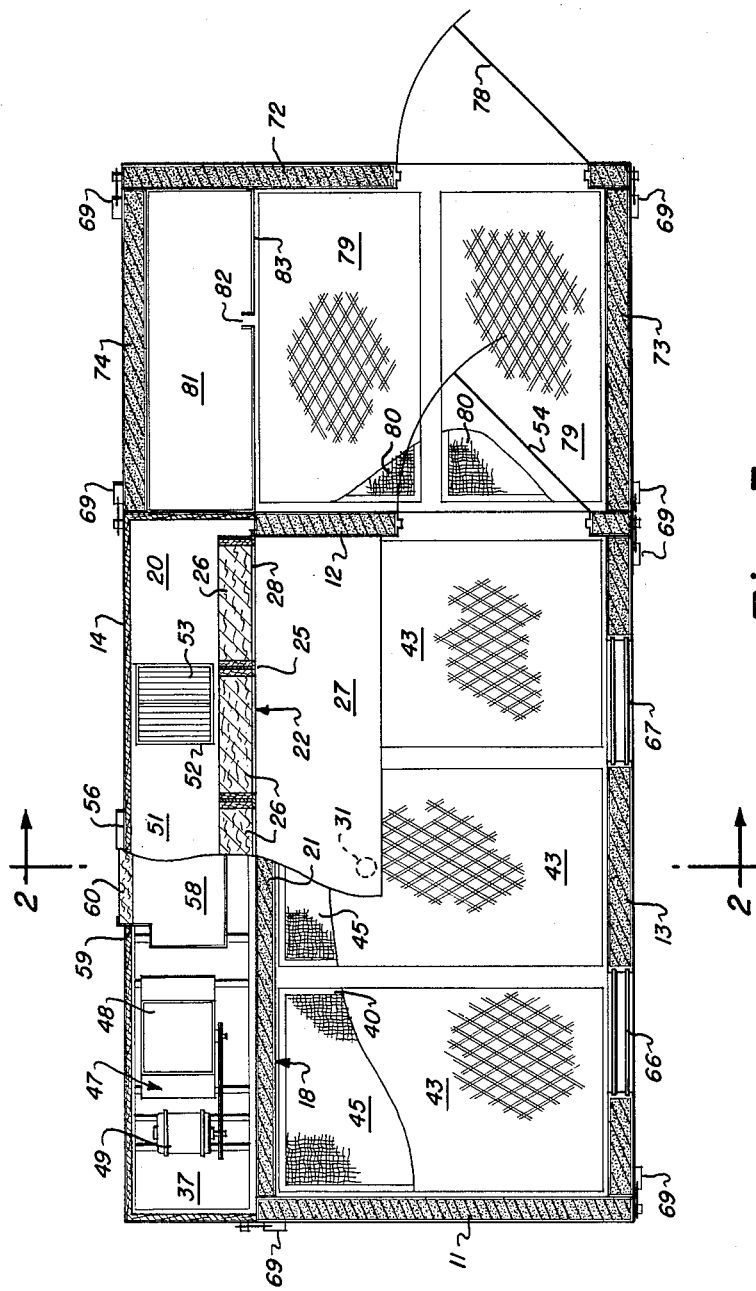
FIG. 3 is a plan view taken generally along line 3—3 of FIG. 1.

Described generally the present invention as illustrated in FIGS. 1-3 of the accompanying drawings comprises a complete self-contained clean room structure having side walls, end walls, ceiling and base attached to each other for forming a substantially air-tight enclosure. The enclosure is divided into compartments or chambers by several partition means, one of which extends generally between the ceiling and the base and another of which extends generally between the side walls and the end walls, thus forming a relatively large compartment or working area and several smaller compartments or chambers. The first mentioned partition means is provided with a bank of highly efficient sub-micron filters and the other partition means has closely associated therewith filters of lesser efficiency. Air moving means are disposed within the enclosure intermediate the chambers and function to pull, in a continuously circulating manner, large amounts of air from the working area through the less efficient filters and thence deliver it back into the working area as ultra-clean air through the sub-micron filters. Within the working area and adjacent the first partition means may be disposed a work bench, the surface of which lies in the path of the clean air re-entering the room and is thus continuously "swept" clean by the incoming clean air. The partition means extending between the side walls and the end walls which is exposed to the working area is a perforate member forming substantially the entire floor of the working area. The sub-micron filters are positioned adjacent to the work bench and extend substantially from end wall to end wall and from bench to ceiling. Thus with such large "openings" through the working area floor and the partition means above the work bench, a large volume of air can be circulated through the working area so as to maintain the latter substantially free of dust particles and other contaminants larger than about one-third micron.

In the form of the present invention as illustrated in FIGS. 5–8 air re-entering the working area passes through a diffuser means adjacent the ceiling and travels substantially vertically through the working area and out through the perforate floor. The substantially vertical air-flow pattern through a working area is particularly desirable for situations where the work within the clean room is carried on at the center of the room. For example, in a hospital operating room the operating table will normally be placed at the center of the room. Thus the air flowing from the ceiling "sweeps" the contaminants in the air or which are normally emitting from surrounding structures or persons from the operating room before such contaminants have a chance to reach a patient on the operating table.

The embodiments of the present invention, as above briefly described, are primarily self-contained clean rooms that are built as units separate from other surrounding structures; however, the principles of the present invention may be utilized to "up-grade" present clean rooms or be built right into existing enclosures, such as, hospital operating rooms.

Described more particularly the clean room embodiment as illustrated in FIGS. 1–4 comprises a self-contained structure made up from a pair of end walls 11 and 12, a pair of side walls 13 and 14, a roof or ceiling 15 and a base 16 with each wall being attached in a suitable manner to the ceiling 15 and the base 16 so as to provide a completely enclosed airtight space or chamber. Within the chamber a vertical partition means, generally indicated at 18, extends between the ceiling 15 and the base 16 and engages the end walls 11 and 12 to divide the chamber into a pair of compartments or chambers 19 and 20 with the compartment 19 being substantially larger so as to function as the working area in the clean room. The vertical partition means 18 may comprise a pair of sections 21 and 22 each of which is coextensive with the side walls and which are attached to each other at a point approximately intermediate the ceiling 15 and the base 16. Partition section 21, which is the lowermost section, is normally impervious and may be provided with a longitudinally extending flange or angle iron 24 adjacent the top edge thereof. The uppermost section 22 may comprise an open frame work of small angle irons 25 which may be rigidly attached to the angle iron 24 in any suitable manner, such as, for example, welding, boiling or the like. The open frame work of the upper section may be provided with a plurality of equal size openings therethrough which are each adapted to receive and carry a highly efficient sub-micron air-filter 26 as will be described in greater detail below. The portion of the open frame work exposed to the compartment 19 may be covered with a fine mesh wire screen 28 to enhance filter element support and appearance.

At the point where the partition sections 21 and 22 are joined to each other, a work bench 27 or the like, which extends laterally outwardly from the sections 21 and 22 into the working area of compartment 19, may be positioned in such a manner that the upper surface of the bench 27 is approximately on the same horizontal level as the bottom edge of the lower filters 26 so that the air emitting from the filters 26 passes directly over the upper surface of the work bench 27 in a "sweeping" fashion. The work bench 27 may extend the full length of the working area and be held in a desired position in any suitable manner, such as, for example, by a pair of angle irons 29 and 30 attached to the end walls 11 and 12 respectively, and a removable middle supporting leg 31. The inner part of the work bench 27 may rest upon the top edge of section 21 and, if desired, be attached thereto in any suitable manner.

To provide the working area compartment 19 with a floor, the base 16 may be of a generally cup-shaped configuration having a re-entrant or laterally inwardly extending flange 32 substantially about its periphery at the upper edge thereof. A dividing member 33, which lies generally parallel with and substantially directly beneath the partition section 21, may be secured in the base 16 so as to divide the latter into compartments 36 and 37 and be provided with a plurality of apertures 35 therethrough and a laterally extending flange 38 at the uppermost edge thereof. The flange 32 on the base 16 may be provided with a pair of stepped sections 40 and 41 which extend substantially the length of the side wall 13 and along the end walls to approximately the base dividing member 33. The flange 38 on the dividing member 33 may also be provided with stepped sections which are similar to the stepped sections 40 and 41. A removable partition means or working area floor 42 may be placed between the flanges 32 and 38 so as to "rest" upon the uppermost stepped section 40 and function as a divider between the compartments 19 and 36. The floor 42 may comprise a metal grating 43 capable of supporting relatively large weights and yet provide relatively little resistance to air-flow passing from compartment 19 into compartment 36.

There may be provided immediately below the metal grating 43 and upon the stepped section 41, air-filters 45 of less efficiency than the air-filters 26 as will be described in detail below. These air-filters 45 are, due to the inaccessibility from the base side of the clean room, normally placed in position prior to the placement of the metal grating 43. Thus, if the clean room is relatively large, the weight and size of the metal grating 43 may be too great to gain easy access to the filters 45 mounted therebeneath. Therefore, it may be desirable to divide the metal grating into smaller more easily handled sections. In order to support the smaller grating sections the base 16 may have therein flanged metal members 46 which extend between the dividing member 33 and the base wall under the side wall 13. Each of the flanged members may be provided with stepped grating and filter retaining sections similar to the stepped sections 40 and 41, thus facilitating the use of the smaller sections of metal grating 43 and smaller more easily supported filters 45.

To circulate the air through the filters 26 and 45 and the various compartments in the desired fashion as shown by the air-flow indicating arrows in FIG. 2, there may be provided between the partition means 18 and the side wall 14 air moving means which are generally indicated at 47. The air moving means 47 may each comprise an air-blower 48, such as a centrifugal blower, of suitable capacity and a blower operating means, such as an electric motor 49. In order to have the air moving means 47 circulate the air through the various chambers there may be provided between compartments 20 and 36 a partition 51 which effectively separates the two compartments so as to cause the compartment 20 to function as a plenum chamber while the compartment 36 along with compartment 37 and the space adjacent the air moving means are kept slightly below atmospheric pressure. The partition 51 may laterally extend from the partition section 21 adjacent the flange 24 to the side wall 14 and be provided with an opening 52 therethrough which may have a suitable diffuser 53 mounted therein. With such an arrangement the outlet of the blower 48 may be attached to the partition 51 about the opening 52 while the inlet to the blower may be exposed to the space adjacent the air moving means which is in open communication with chamber 36.

In operation the blower 48 pulls the air from the space thereabout and discharges it into the plenum chamber 20 where the difference in pressure between compartment 19 and chamber 20 causes a pressure drop across the bank of filters 26 as the air flows into the compartment 19 where once again due to a pressure difference between compartments 19 and 36, a further pressure drop occurs, this time across the air-filters 45. By utilizing the filters 26 and 45 as slight air-flow inhibiting or restricting means, the desired pattern of air-flow through the various compartments is attained in that the pressure drop across the filters 26 and 45 assures that the volume of air passing through the filters at any one point is substantially equal to the volume of air passing through the filters at any other point. This feature of equal air flow through all parts of the filters is highly advantageous since a large volume of ultra-clean air may be passed into the compartment or working area 19 through filters 26 and air movement be barely perceptible to a person standing in front of the filters. Also with such a large flow of clean air through the filters 26 the dust particles, both the microscopic and visible ones, are "swept" from the work bench and from other portions of the working area and carried immediately to the floor and trapped in the filters 45 before such particles can alight upon the bench. The pressure drop across the filters 45 below the floor grating performs a function similar to the function of the pressure drop across the filters 26 in that the particulate bearing air leaving the working area 19 flows through all sections of the filters 45 at substantially equal rates thus insuring that the entire working area is provided with constantly moving air.

The air pressure within the working area 19 during operation is normally maintained at a pressure slightly above atmospheric pressure, such as, for example, on the order of five-hundredths of an inch water pressure above atmospheric pressure, so that when an entrance way into the working area 19, such as a door 54 in end wall 12 is opened, there will be an outward movement of the air from the room to prevent the entrance of dust particles. To replenish the air supply of the circulating system which becomes depleted in any manner, such as by opening the door 54, there may be provided a "make-up" air opening 56 through the side wall 14. Since the pressure is lower than atmospheric in the compartment or space adjacent the air moving means the air from the outside will be entrained thereinto and circulated. A suitable air-filter 57 which may be a high efficiency sub-micron filter and/or a filter of less efficiency should be placed within the opening 56 so as to prevent large amounts of relatively contaminated air from entering the air circulating system which would necessitate the changing of the filters 26 more frequently.

The self-contained construction of the clean room permits the latter to be used in any desired environment, in or outside of a building. Thus there may be provided in the air-circulating system an air conditioning means 58, such as a reversible heat pump or the like, which is capable of cooling or heating the air so as to maintain desirable working conditions within the clean room. The air conditioning means 58 may be placed adjacent the air moving means 47 and be provided with communication to the outside through an additional opening 59 in the side wall 14 which may have therein a suitable filter 60 which may be similar to the filter 57 in opening 56.

The self-contained construction of the clean room also lends itself to another desirable application in that it may be made up as a portable, all-weather unit capable of being operated in areas without further outside weather protection. However, in addition to providing air conditioning means it may be desirable to construct the clean room in such a manner that changing temperatures and weather conditions do not adversely affect the working environment within the clean room working area. To accomplish the desired construction the walls 11–13 and the ceiling 15 may be made up of spaced apart metal sheets with a suitable insulation such as foamed plastic or the like therebetween. The partition section 21 may be similarly constructed. Thus the insulated double walls and ceiling not only serve to offset temperature and weather conditions but also function as sound-deadening structures.

To obtain sufficient working light within the clean room there may be provided immediately above the ceiling a pair of fluorescent light assemblies 62 and 63 which may extend substantially along the length of the ceiling, the light assembles 62 and 63 may be separated from the clean room working area by a pair of spaced apart transparent panes 64 and 65 which are attached to the ceiling in an airtight dustproof manner. The lights may be easily removed and replaced from above if necessary. Additional working light may be introduced into the clean room through suitable double paned windows such as the windows 66 and 67 in the wall 13 and if desirable through the door 54 which may be provided with a pair of spaced apart transparent panes. The windows and door should be appropriately sealed around their edges so that no contaminants may enter the working area.

When making portable clean rooms either a rigid, unitized construction or a "knock down" construction may be used. In the rigid, unitized construction (such as shown in FIGS. 5–8) all the walls, except for the side wall 14, the ceiling and the base are joined to each other in any suitable dustproof and rigid fashion such as welding, bolting or the like. The side wall 14, which may be of double wall construction, may then be attached in an airtight manner to the base, ceiling and end walls by using suitable removable attaching means such as bolts, latches, etc. The side wall 14 is removable so as to provide access to the filter bank 26 and the air moving means including the air conditioning means, thus allowing the filters 26 to be easily removed and cleaned or replaced when they become clogged and the servicing of the air circulating system. Also, if desired, a false roof (not shown) may be provided above the lighting system for added protection to the clean room.

It may be desirable to provide the rigid unit with suitable dimensions so that it may be easily transported on a truck or the like. For example, a clean room approximately eight feet wide, eleven feet long and nine feet high may be easily moved on the highway without obtaining special permits. When using a room of the above dimensions, the filter bank 26 may comprise two rows of filters, with each row having five separate sub-micron filters each two feet long and two feet wide.

The filters 26 may be of any suitable commercially available type, such as, for example, an Absolute filter manufactured by Cambridge Filter Corporation of Syracuse, New York. The Absolute filter comprises a glass-asbestos medium in a closely pleated package having corrugated separators between the pleats. The air-filtering ability of the Absolute filter is such that 99.97 percent of all particles above one-third micron are removed from an air stream passing through the filter. If desired other commercially available sub-micron filters may be used but they should be at least as efficient as the Cambridge Absolute filter. The filters 45 beneath the floor grating are comparably "rough" with respect to the sub-micron filters 26 in that they prevent the passage of 60 to 70 percent of all particles between 10 to 20 microns in size. However, since the air is leaving the room through the filters 45, their primary function is not to thoroughly cleanse the air but act to provide a particle trap, a suitable pressure drop between compartments 19 and 36 and to prevent overloading the sub-micron filters 26 with relatively large dust particles which would necessitate frequent changes of the sub-micron filters. These "rough" filters may be of any suitable, commercially available type such as the type commonly used in hot-air home furnaces. It may be desirable to reinforce the filters 45 so that they maintain their desired shape under the metal grating 43.

The airflow through the clean room working area should be sufficiently large so as to enable the air within the working area to be changed approximately ten times per minute. It has been found that in a clean room having dimensions similar to those described above, ultra-clean air circulated at about 4000 cubic feet per minute accomplishes the desired air change and that such an air-flow through the large bank of filters 26 is attainable with a relatively low velocity which is in the order of about 100 feet per minute or about one mile per hour. At this velocity the large amount of air moving into the clean room is barely perceptible and yet is able to "wash" or "clean down" the working area to where there are less than 1000 particles of dust over one-third micron per cubic foot of air and no particles over one-half micron in less than 20 seconds after initially starting up the air-circulating system.

The air-flow of 4000 cubic feet per minute may be obtained by using a pair of blowers 48 (one of which is shown) each rated at a capacity of about 2000 cubic feet per minute and which may be of any suitable commercially available type. While two such blowers are used it will appear clear that any desired number of blowers of various capacities may be used to accomplish the needed air-flow.

Figure 4:
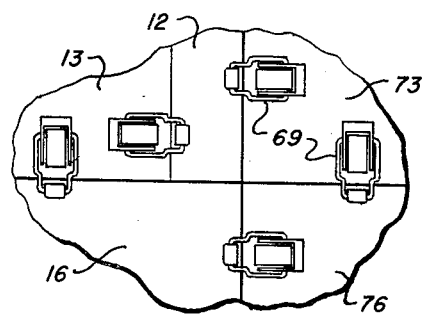
FIG. 4 is a fragmentary view taken between the air shower and the clean room showing a latching arrangement for joining the various walls.

The "knock down" unit illustrated in FIGS. 1–4 comprises a structure similar to the rigid, unitized unit in design and operation except that it may be readily disassembled into relatively small sections which may be easily moved through a standard three foot door. To attain sections of desirable size, a "knock down" clean room having dimensions similar to the rigid clean room above described may have the ceiling 15 and the base 16 "broken" lengthwise into sections where they contact the partition means 18 and the dividing member 33 respectively. The end walls 11 and 12 may also use the partition means as the junction point where they are vertically separated into sections. The side walls and end walls are separable from the ceiling and base and from each other at the points of contact therebetween. With a clean room "broken-down" into sections as above described, the partition means 18 and the work bench 27 may be easily removed and disassembled for separate handling. The disassembled sections may be attached to each other in their proper positions by using suitable connectors such as heavy-duty trunk latches 69 or the like in any desired arrangement such as shown in FIG. 4. A suitable seal such as a deformable rubber gasket 70 or the like may be placed between the respective sections so that an airtight seal is attained when the sections are "latched" together.

Normally the clean room of the present invention is so efficient that an air shower or air lock combination is not necessary for preventing an excessive amount of dust particles from entering the working area. However, in the event the clean room is operated in an environment that is extremely dirty such as outside a building in a dusty area, it may be desirable to provide the clean room with an air shower or air lock. The air shower or air lock may comprise a structure somewhat similar to the main clean room in that it may be provided with an end wall 72 secured to a pair of side walls 73 and 74 which are each in turn secured to a ceiling or roof 75 and a generally cup-shaped base 76. Like the clean room, the air shower or air lock is provided with an outwardly swinging door 78 in a suitable wall, a metal grating floor 79 and "rough" filters 80 upon the base 76 and an air circulating system including sub-micron filters (not shown but normally contained within space 81). A vertical slot 82 may be provided in a partition member 83 so as to provide communication between the air circulating system and the space in the air shower or air lock above the floor grating. When operating, ultra-clean air is directed through the slot 82 at a relatively high velocity, for example, in the order of 40 miles per hour, so that a person standing in front of the slot has the loose particles on his clothing blown off and into the filter 80 underneath the floor grating 79.

The air shower or air lock may be of a "knock-down" construction similar to the "knock down" construction of the clean room and be capable of attachment to the end wall 12 in an airtight manner by latches 69 or the like. The air shower or air lock may be attached to either the rigid or the "knock down" clean room. The connection between the clean room and the air shower or air lock may be similar to the "latching" connection illustrated in FIG. 4.

In construction the rigid and the "knock-down" clean rooms, it has been found that painted galvanized sheet metal is satisfactory for the walls of the rigid clean room, whereas, in the "knock down" clean room the wall segments may be subjected to relatively rough handling, thus making preferable the use of a stronger and more scratch-resistant metal such as stainless steel or the like.

The self-contained clean room construction of the embodiment illustrated in FIGS. 1–3 lends itself very readily to several different configurations and sizes. For example, if a large clean room is desired, several smaller clean rooms may be attached end to end with the abutting end walls therebetween removed so as to provide a relatively long and unbroken clean room. Another configuration of the clean room may comprise a "double unit," that is, a pair of clean rooms arranged side-by-side with the abutting side walls removed and with the ceiling, base and end walls of each unit attached to like members in the other unit. When assembled the "double unit" may have the work benches and air circulating systems along opposite side wall thus providing a much larger working area without sacrificing the high cleaning efficiency of a smaller room.

The clean room embodiment illustrated in FIGS. 5–8 is provided with a similar air circulating system adapted for a clean room working area where the work table is placed at the center of the room. For example, this clean room construction may be used as an operating room in a field hospital.

Like the clean room illustrated in FIGS. 1–3 this clean room comprises a self-contained structure made up from a pair of end walls 110 and 111, a pair of side walls 112 and 113, a roof or ceiling 114 and a generally cup-shaped base 115 with the walls attached to the roof and the base and to each other in such a manner as to provide an airtight completely enclosed space. The walls and roof may each comprise an insulating construction similar to the walls and roof in the clean room of FIGS. 1–3. Within the enclosed space defined by the walls, roof and base, there may be provided a second space or working area 124 having a pair of partitions 118 and 119 (which may be of the insulated double wall construction), a perforated ceiling 120 and a perforated floor 121.

If the clean room of this embodiment were to be "cut" into two lengthwise portions along a vertical plane through the center of the room, the resulting portions would be substantially similar to one another. Thus in order to describe this embodiment in detail without undue verbosity and the use of an excessive number of reference numerals, only one portion will be discussed in detail below, of course, bearing in mind that the other portion contains similar components.

Figure 5:
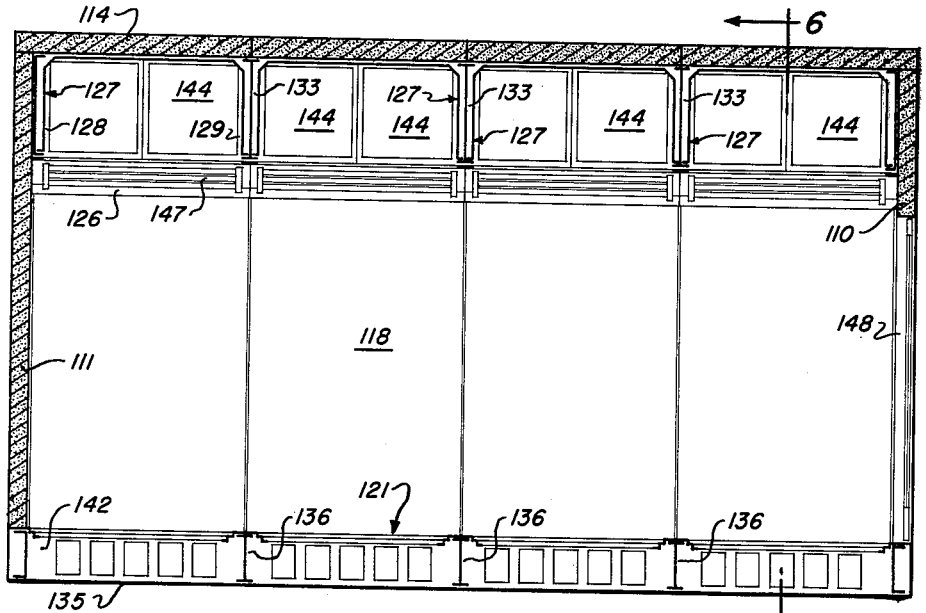
FIG. 5 is a skeletonized longitudinal sectional view of another embodiment of the present invention.
Figure 7:
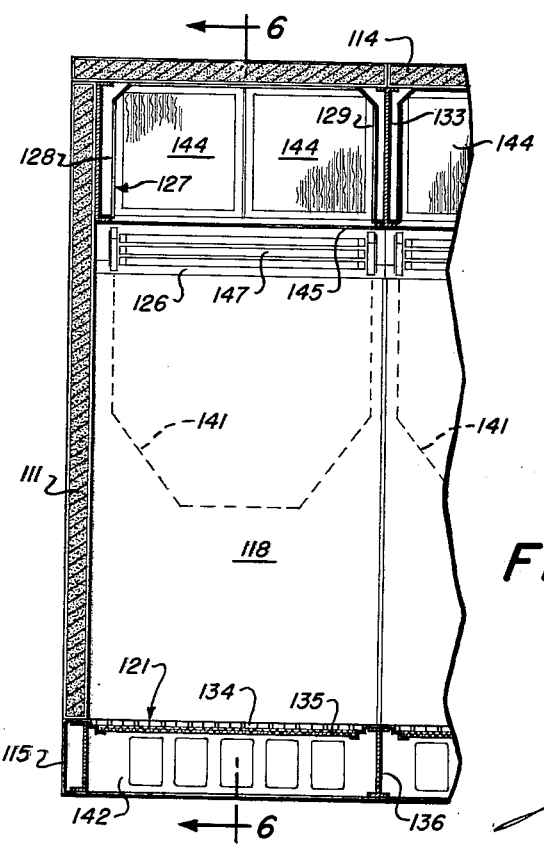
FIG. 7 is a fragmentary longitudinal sectional view taken generally along line 7—7 of FIG. 6.

As shown in FIG. 5 one side of the clean room is divided into a plurality of sections (four shown) each of which may be provided with its own complete air circulating system. In order to form each section, the partition 118 may be inwardly spaced from the side wall 112 to form compartments or chambers 123 and 124 on either side thereof. The partition 118 may extend from end wall 110 to end wall 111 where it may be secured and thus provide a common partition or chamber forming means for each section. A plurality of vertically extending metal beams 125 may be positioned between the partition 118 and the side wall 112 from the roof 114 to the base 115 so as to divide the chamber 123 into the above mentioned separate sections.

As with the embodiment of FIGS. 1–4, the height of upright partition 118 falls somewhat short of reaching the roof 114 so as to provide a space therebetween for establishing a communication path between opposite sides of the partition 118. A generally triangular metal frame 126 may be secured adjacent to the top of the partition 118 and extend the length thereof and be so mounted thereon that one side of the frame is substantially parallel with the partition while the uppermost side of the frame extends laterally inwardly therefrom.

Adjacent the ceiling and between each pair of metal beams 125 or between a metal beam 125 and an end wall, there may be provided a laterally inwardly extending air-chamber means 127 having a pair of side walls 128 and 129 and a vertically extending end wall 130 all of which vertically terminate on a horizontal plane substantially level with the upper side of the metal frame 126. The chamber means 127 extends about halfway into the clean room working area and may be held in its desired position by flanged metal support 131 extending vertically from the roof 114. Additional support for the chamber means 127 may be provided by further flanged metal supports 133 which extend laterally from support 131 and are attached to the side walls 128 and 129 of the chamber means 127. In addition to supporting the chamber means 127 the metal supports 131 and 133 form supporting structure for the roof 114.

The floor 121 comprises structure quite similar to the floor 42 of the clean room embodiment illustrated in FIG. 1–3, in that it comprises removable metal gratings sections 134 with relatively low-efficiency air-filters 135 directly therebeneath with both the gratings and the filters being mounted on stepped sections of the base 115. The base 115 may be divided into chambered sections 138 corresponding in size to the sections in chamber 123 as defined by the metal beams 125 by providing a like number of transversely extending base dividing beams 136 which may have flanged upper portions with stepped sections for supporting the grating sections 134 and the filters 135 and which may extend from a point approximately under the partitions 118 and 119 across the width of the working area. The beam 136 is intersected by a base dividing beam 137 extending lengthwise across the base 115 between each pair of beams 136 and which may have a flanged upper portion with stepped sections for providing additional support for the gratings and filters.

As briefly described above, each section may be provided with its own air circulating system, which, like the air circulating system in the embodiment illustrated in FIGS. 1–3, may comprises a suitable blower and blower driving means. The blower and the blower driving means (not shown) may be mounted in a suitable housing 139 outside the clean room so as to be readily accessible for maintenance work and the like. Suitable air conveying means such as air ducts 140 and 141 may be attached to the housing 139 for connecting the blower into the circulating air-path. The blower inlet air duct 140 may comprise a generally "cone" shaped metal duct which passes through a suitable opening in the side wall 112 with the larger open end thereof communicating with chamber 138 in the base 115. It may be desirable to place an apertured member 142 across the duct opening to provide additional support for the working area floor 121. The blower outlet air duct 141 may comprise a metal duct which extends from the blower into the chamber 123 through a suitable opening in the side wall 112 and which then flares outwardly to take a shape generally conforming to the open space in each chamber 123. The discharge end of duct 141 terminates adjacent the top of the partition 118 in communication with the chamber means 127. It may be desirable to place suitable seals around the portion of the duct 141 within the chamber 123 to insure that no dust particles enter the working area 124 through a leak around the air duct.

Within each chamber means 127 at a point approximately above the partition 118 there may be placed high-efficiency sub-micron filters 144 which may extend between the ceiling 114 and the upper side of the metal frame 126. The filters 144, which should be appropriately positioned and sealed so that no air leakage occurs around their edges, may be removed from their position from the interior of the clean room. While only one row of filters 144 are shown above the partition 118 it will appear clear that the partition 118 may be of a lesser height than that shown with a plurality of filter rows thereabove.

Air-filters 135 and 144 may be similar in construction and efficiency to the air-filters 45 and 26 respectively, as used in the embodiment illustrated in FIGS. 1–3. Also a suitable "make-up" air opening not shown) may be provided in each blower housing 139 with a sub-micron and/or a less efficient filter in the opening.

Figure 6:
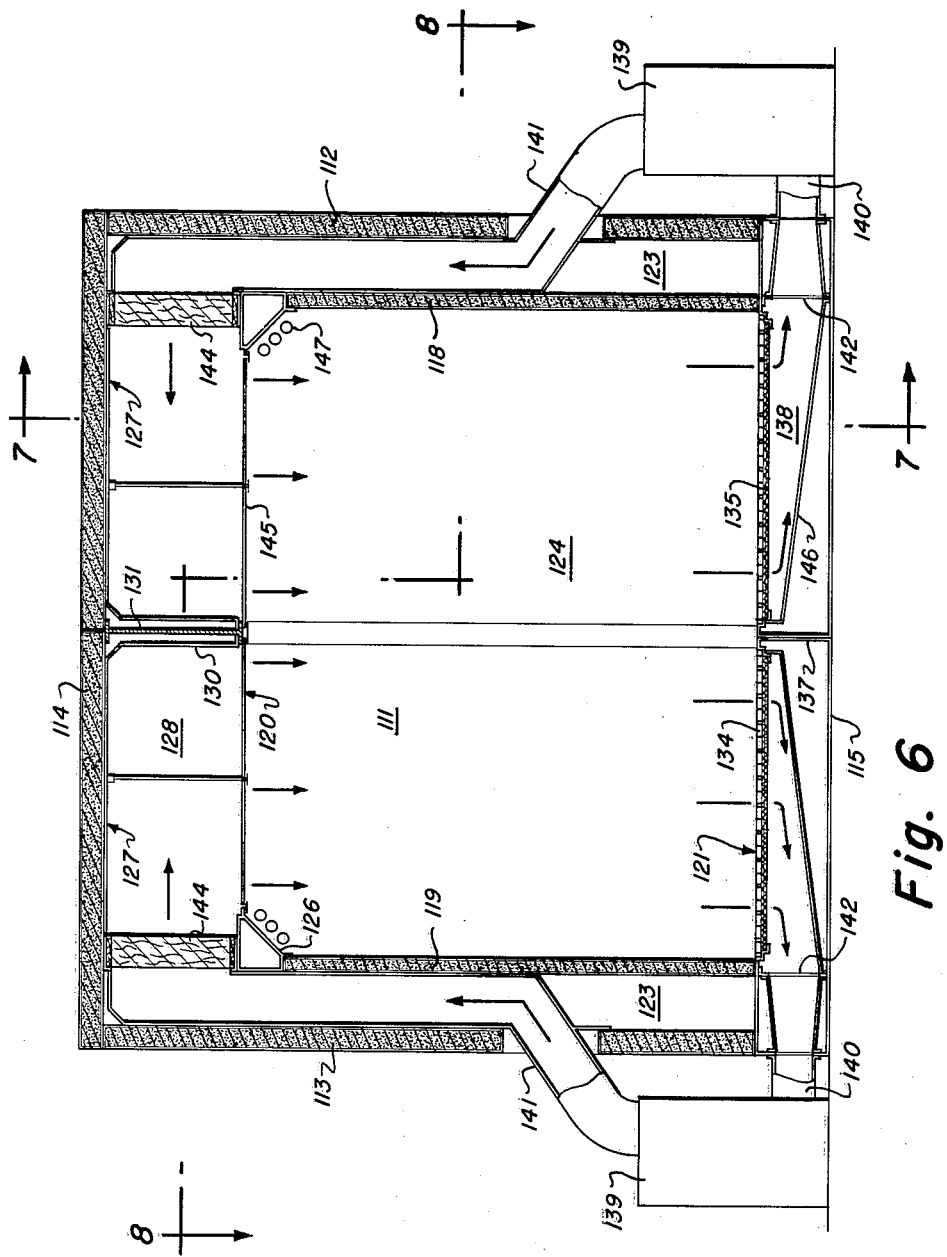
FIG. 6 is a transverse sectional view taken generally along line 6—6 of FIG. 5.
Figure 8:
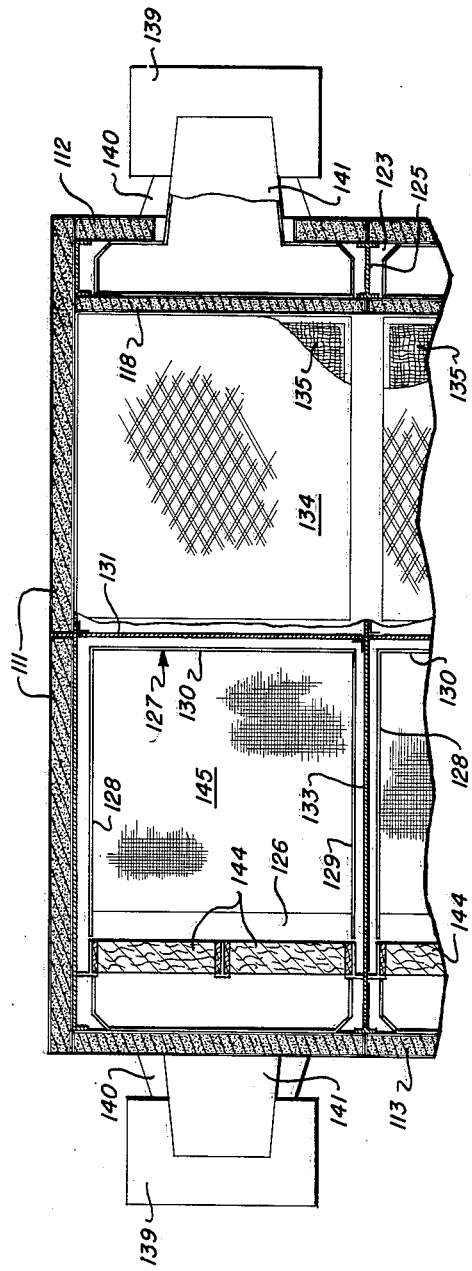
FIG. 8 is a fragmentary plan view taken generally along line 8—8 of FIG. 6.

In operation this embodiment functions similarly to the embodiment illustrated in FIGS. 1–3 in that the filters act as slight air-flow restrictors to create the necessary pressure drops thereacross so as to provide the desired air pressure within the clean room working area 124, and the desired air-flow pattern therethrough as indicated by the arrows signifying air-flow (FIG. 6). In the construction of the clean room in FIGS. 5–8 the ultra-clean air enters the clean room from above the working area and flows downwardly in a susbtantially vertical direction towards the floor 121 catching and carrying the dust particles into the dust "trapping" floor filters 135 as it moves. The volume of air-flow within this embodiment of FIGS. 5–8 is preferably such that it changes the air in the clean room about ten times per minute. Thus, for example, if each section is four feet wide each side of the clean room containing four sections as illustrated and with the width and height of the room interior being ten feet and seven feet respectively, it would require each of the eight blowers to deliver about 1400 cubic feet of air per minute to attain the required air volume. Of course, if the room is larger or smaller than that set forth as an example, the air output of the blowers would be different.

In order to insure that the ultra-clean air entering the working area 124 through the filters 144 is of equal velocity and volume throughout substantially the entire working area 124, the perforate ceiling 120 may be provided along the bottom of each chamber means 127 for acting as a suitable air-diffusing means and which may comprise a fine-mesh wire screen 145. The screen 145 may be releasably attached to the metal frame 126 and the metal beam 131 so that it may easily be removed for permitting access to the filters 144. Also a metal rod 143 may extend from the ceiling to aid in supporting the wire screen.

If desired, a slanting metal plate 146 may be placed within the base 115 so as to help attain a more equal pressure drop across the floor filter 135 and to provide a means of draining off liquids or the like which may accidentally spill upon the clean room floor.

Lighting may be provided in the clean rom by placing banks of fluorescent lights 147 or the like upon the triangular metal frame 126 and by double-paned windows (not shown). Access into the clean room may be attained by placing a suitable door 148 in either end wall 110 or 111. While the clean room is shown as a rigid construction which contains four sections of separate air circulating systems on each side of the room, it will appear clear that the clean room may be of the "knock down" type and of any desired dimensions. Also if desired, suitable air conditioning means such as reversible heat pumps or the like (not shown) may be easily placed adjacent the housings 139 so that the air entering the blowers may be properly conditioned and, if desired, an air shower or air lock similar to the air shower or air lock illustrated in FIGS. 1–3 may be attached to the clean room adjacent to the door opening.

It may be desirable to provide the clean rooms of the present invention with air pressure meters that show the pressure load of each blower, the pressure drop across the high efficiency sub-micron filters, and the static room pressure. Thus, for example, if the pressure drop across the sub-micron filters is excessive to such an extent that the static pressure within the clean rooms drops toward ambient pressure from the preset level, it is an indication that the sub-micron filters need to be changed.

Figure 9:
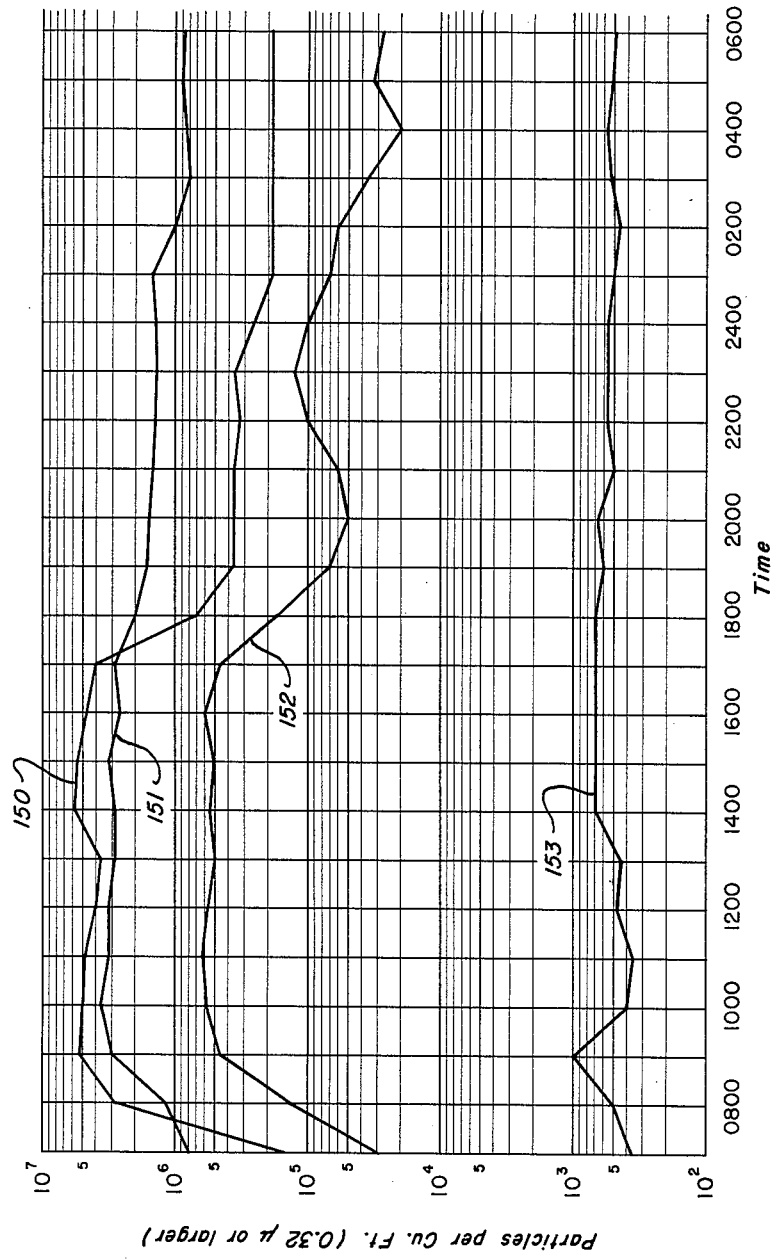
FIG. 9 is a graphic representation comparing the cleanliness of the present invention with heretofore known "clean" working areas.

In FIG. 9 there is shown a chart or graph which provides a graphical illustration of the number of dust particles per cubic foot of air (one third micron or larger) in typical heretofore known clean rooms and dust controlled hoods as compared with the dust particles per cubic foot of air in the clean rooms of the present invention over a twenty-four hour period within which there is a typical eight hour working day. Lines 150, 151 and 152 indicate contamination in a pair of clean rooms and a dust controlled hood within a clean room respectively, while line 153 indicates an ultra-clean room utilizing the principles of the present invention. During normal working hours, i.e., between 0800 and 1700, the dust levels in the rooms 150 and 151 and the hood 152 rise very sharply to where the dust particle count per cubic foot of air in the rooms is well over one million ($10^6$) and the hood is about five hundred thousand ($5 \times 10^5$). On the other hand the dust particle count per cubic foot of air in an ultra-clean room of the present invention remains at a level less than one thousand ($10^3$). The sharp rise and drop indicated on line 153 at about 0900 was the result of cigarette smoke being blown into the room to check its effects upon room cleanliness and as indicated the room contamination level remained below 1000 particles per cubic foot which further emphasizes the highly efficient air cleansing qualities of the present invention.

As will be seen the present invention sets forth a new concept in clean room construction which provides working environment cleanliness heretofore unheard of. Hospitals utilizing the principles of the present invention in their operating rooms will find that presently highly dangerous virus in operating room such as hemolytic *Staphylococcus aureus* (more commonly known as "staph") is greatly reduced thereby reducing post-operative infections normally caused by such virus. Also with the clean rooms of the present invention being capable of "clean-down" in less than 20 seconds after start up, substantial savings may be attained by shutting the clean room down after each working day or each use.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A substantially dust-free device of the character described comprising closure means forming an enclosed volume including therein a plenum chamber occupying a major part of said volume, air moving means including a blower and air duct structures in registry with the plenum chamber, the cross sectional area of said air duct structures being substantially less than that of the plenum chamber, a work area disposed adjacent to said enclosed volume, a portion of said closure means forming a common wall separating the enclosed volume from said work area and having an opening therethrough for providing communication between said plenum chamber and said work area, said opening having a major dimension substantially coextensive in length with a cross sectional length of the plenum chamber, a sub-micron air-filter disposed within said opening, said blower when in operation discharging air into said plenum chamber to form a body of air maintained at a pressure above ambient pressure, said sub-micron air-filter providing a restrictive outlet for the flow of pressurized air from said plenum chamber into the work area such as to create a pressure drop across said sub-micron air-filter for assuring that air flows into said work area through said air-filter at substantially equal volume and velocity throughout all portions thereof, and an additional air-filter of lesser efficiency than said sub-micron air-filter disposed intermediate the work area and an inlet to said blower for pre-filtering the air.

2. A substantially dust-free device of the character described comprising closure means forming an enclosed volume, a work space disposed adjacent to said enclosed volume with parts thereof defined by portions of said closure means, one of said portions forming a common wall separating the work space from said enclosed volume and having an opening therethrough providing communication between the enclosed volume and the work space, a sub-micron air-filter disposed within said opening, said work space including a working surface disposed generally normal to said air-filter, air moving means operatively associated with said enclosed volume, and volume dividing means including said closure means defining a plenum chamber disposed in said enclosed volume intermediate said air moving means and said air-filter, said air moving means discharging air into the filter, said air moving means discharging air into the plenum chamber where the air is normally maintained at a pressure above ambient pressure and thereafter passing the air into the work space through said air-filter and across the working surface in a direction generally parallel with respect thereto such as to sweep air-borne particulate matter from the working surface and thereby maintaining the latter essentially free of contaminants.

3. The substantially dust-free device claimed in claim 2 wherein said one portion comprises an upright wall, and said opening through the wall is substantially coextensive with the length of the wall and an upper portion of said opening is disposed adjacent to an upper surface of the work space and a lower portion thereof disposed generally vertically downwardly from said upper portion such that the air-flow emitting from the air-filter enters the work space in an essentially horizontal direction.

4. In a device of the character described, the combination of a pair of spaced apart generally upright end walls, a top wall spanning the distance between said end walls and secured thereto, a generally horizontal work surface below said top wall extending between said end walls having a rear edge and an exposed working surface, a generally upright partition including sub-micron air-filtering means extending along said rear edge between said work surface and said top wall and interconnecting said end walls for guiding air flow across said exposed working surface and through the space overlying said working surface in a direction substantially parallel to said working surface, further air-filtering means of lesser efficiency than said first-mentioned filtering means disposed beneath said working surface for filtering air subsequent to passage of the air across said working surface and through said overlying space, a generally upright wall member spaced from said upright partition and first-mentioned filtering means forming therewith and with a portion of said top wall a plenum chamber disposed immediately behind said first-mentioned filtering means and in registry with said working surface and the overlying space, and means including a blower and air duct structures intermediate said lesser efficiency filtering means and said plenum chamber for drawing air through the former and discharging it into said plenum chamber for flow through the sub-micron air-filter and across said working surface and through the overlying space.

5. A substantially dust-free room comprising in combination a plurality of interconnected closure means forming an enclosed volume, partition means coextensive in length with a pair of said closure means dividing the volume into a plurality of chambers with one of the chambers being substantially the larger for providing an enclosed working chamber, each said partition means having an opening therethrough substantially coextensive in length therewith, a sub-micron air-filter substantially filling one of the openings, a further air-filter of lesser efficiency than said sub-micron air-filter obstructing air flow through another of said openings, air moving means having an inlet and an outlet operatively associated with another of said chambers such that the outlet of said air moving means into said another chamber communicates with and partially defines a plenum chamber immediately adjacent to said sub-micron air-filter, an additional one of said chambers disposed adjacent said further air-filter being connected to the inlet of said air-moving means, said air moving means continuously circulating air in a seriatim manner through said chambers in initially discharging the air into the plenum chamber thence through the sub-micron air-filter into the working chamber and subsequently through the further air-filter and into the chamber connected to the inlet of the air moving means, the sub-micron air-filter and said further air-filter providing resistance to the flow of air for effecting pressure drops thereacross to assure that volume and velocity of air-flow entering the working chamber through the sub-micron air-filter are substantially the same throughout all locations over the surface of said sub-micron air-filter which is exposed to said working chamber.

6. A substantially dust-free room of the character described comprising in combination a plurality of upright wall means and common closures at upper and lower ends thereof forming an enclosed volume, upright partition means substantially coextensive in length with one of said wall means dividing the volume into a pair of chambers with one of said chambers being substantially the larger for providing an enclosed working volume, said partition means having an opening therethrough substantially coextensive in length therewith and with an upper portion of said opening being disposed adjacent to one of said common closures, air-filtering means comprising a sub-micron air-filter substantially filling said opening, grating-like floor means adjacent to but spaced above the other of said common closures and extending between said partition means and other said wall means providing therebeneath a further chamber underlying substantially the entire working volume, said further chamber being interconnected with the smaller of said first-mentioned chambers, additional air-filtering means comprising an air-filter of lesser efficiency than said sub-micron air-filter substantially underlying the grating-like floor means, and air moving means for continuously circulating air in a seriatim manner through said chambers in initially supplying the air to the working volume through the sub-micron air-filter and subsequently withdrawing the air from the chamber beneath said grating-like floor means and said additional air-filtering means, the air within said working volume being normally maintained at a pressure greater than ambient pressure.

7. The dust-free room claimed in claim 6 wherein the opening in the upright partition means has a lower portion thereof disposed about midway between said common closures such that the air entering said working volume initially flows in a direction generally horizontally across said working volume and subsequentially turns and flows in a downwardly generally vertical direction all the while carrying particulate matter in the air and on surfaces of the working volume into the grating-like floor means.

8. The dust-free room claimed in claim 7 wherein a generally horizontally oriented work bench is disposed in said working volume adjacent to said partition means with an upper surface of said bench lying in close proximity to a lowermost edge of said sub-micron air-filter so as to facilitate the passing of the air flowing from the sub-micron air-filter across and substantially parallel to the upper surface of the bench for maintaining the latter essentially free of air-borne particulate matter.

9. The dust-free room claimed in claim 6 wherein air directing means is disposed intermediate said sub-micron air-filter and said working volume for directing the air-flow through the working volume in a generally vertical direction.

References Cited by the Examiner

UNITED STATES PATENTS

| | | | |
|---|---|---|---|
| 710,624 | 10/02 | Sly | 55—483 |
| 1,708,065 | 4/29 | Jordahl et al. | 55—483 |
| 1,898,424 | 2/33 | Collins | 55—483 |
| 2,863,373 | 12/58 | Steiner | 98—36 |
| 2,955,521 | 10/60 | Kurek | 98—36 |
| 3,021,775 | 2/62 | Gygax | 98—36 |

HARRY B. THORNTON, *Primary Examiner.*